GEORGE NOTMAN, OF DEERFIELD, OHIO.

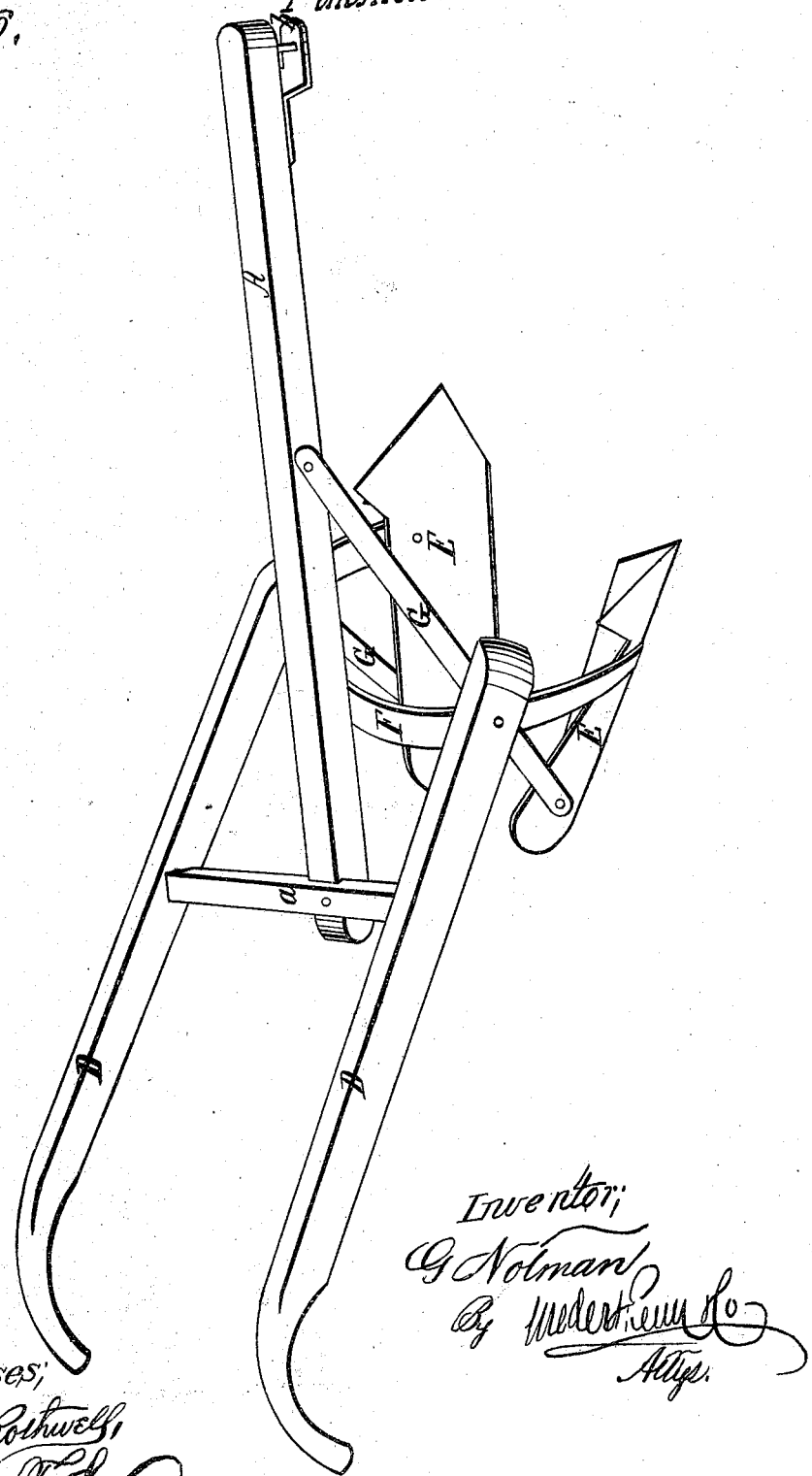

Letters Patent No. 87,356, dated March 2, 1869.

IMPROVEMENT IN HILLING-PLOW.

The Schedule referred to in these Letters Patent and making part of the same.

*To all whom it may concern:*

Be it known that I, GEORGE NOTMAN, of Deerfield, in the county of Portage, and State of Ohio, have invented a new and improved Hilling-Plow; and I do hereby declare the following to be a full, clear, and exact description thereof, sufficient to enable others skilled in the art to which the invention appertains, to fully understand and use the same, reference being had to the accompanying drawing, forming part of this specification, in which my invention is represented by a perspective view.

The object of my invention is to produce a plow which shall possess ready means for hilling the ground, the same consisting of parts which shall be hereinafter more fully described.

In the drawings—

A is the plow-beam.

D D are the two handles, connected together by the cross-bar *a*, which is secured to the rear end of the plow-beam A.

A suitable clevis, *b*, for the attachment of the horses, is placed at the front end of the plow-beam A.

E E are the plowshares, of concave form, diverging from the rear, and having the front ends sharpened, so as to penetrate the soil.

F G G are flat metallic braces, which connect the shares E E with the plow-beam A and the handles D D. The former brace F is rounded in the centre, and secured near the rear end of the plow-beam A, thence to the handles D D, and on the exterior, and near the front end of the shares E E. The latter braces G G are made similar to the former, but are secured a little forward of the centre of the plow-beam A, and to the exterior and rear of the shares E E. The braces F G G being secured to the exterior of the shares E E, leave a smooth, unbroken surface on the interior thereof.

In operating my plow, suitable horse-power is first applied. The shares E E are placed at a suitable angle to the ground, and the machine is then drawn forward. The shares E E, having sharpened edges, and being of a concave form, and diverging from the rear, gather up the soil, which is compressed by the forward motion of the plow.

My plow is simple in construction, and performs its work in a much better and easier manner than those now in use. It is particularly useful in hilling corn and potatoes, and can hill the ground, whether plowed or not plowed.

Having thus described my invention,

What I claim as new, and desire to secure by Letters Patent, is—

The shares E E, constructed and arranged as described, and connected with the handles D D and beam A by means of the braces F G G, substantially as herein set forth.

To the above specification of my improvement in hilling-plows, I have signed my name, this 4th day of January, 1869.

GEORGE NOTMAN.

Witnesses:
DAVID BROWN,
W. S. HOFFMAN.